United States Patent [19]

Axelrod

[11] 4,154,775

[45] May 15, 1979

[54] FLAME RETARDANT COMPOSITION OF POLYPHENYLENE ETHER, STYRENE RESIN AND CYCLIC PHOSPHATE

[75] Inventor: Robert J. Axelrod, Glenmont, N.Y.

[73] Assignee: General Electric Company, Pittsfield, Mass.

[21] Appl. No.: 830,833

[22] Filed: Sep. 6, 1977

[51] Int. Cl.² .............................................. C08L 71/04
[52] U.S. Cl. ................................ 260/874; 260/45.7 P
[58] Field of Search ........................... 260/874, 45.7 P

[56] References Cited

U.S. PATENT DOCUMENTS

| | | | |
|---|---|---|---|
| 3,090,799 | 5/1963 | Wahl | 260/30.6 R |
| 3,383,435 | 5/1968 | Cizek | 260/874 |
| 3,639,506 | 2/1972 | Haaf | 260/887 |
| 3,883,613 | 5/1975 | Cooper | 260/887 |

*Primary Examiner*—J. Ziegler
*Attorney, Agent, or Firm*—Morgan, Finnegan, Pine, Foley & Lee

[57] ABSTRACT

Flame retardant compositions comprising a polyphenylene ether resin, a styrene resin and a cyclic phosphate have excellent appearance and physical properties after molding. Especially useful is diphenyl pentaerythritol diphosphate.

20 Claims, No Drawings

FLAME RETARDANT COMPOSITION OF POLYPHENYLENE ETHER, STYRENE RESIN AND CYCLIC PHOSPHATE

This invention relates to flame retardant thermoplastic compositions, and, more particularly, to compositions comprising a polyphenylene ether resin, a styrene resin, and a cyclic phosphate.

BACKGROUND OF THE INVENTION

Compositions comprising a polyphenylene ether resin and a styrene resin are well known as useful engineering thermoplastics, for molding, extrusion and the like. They are described in Cizek, U.S. Pat. No. 3,383,435, which is incorporated herein by reference.

Such compositions are normally flammable, particularly if high proportions of styrene resin are present, and aromatic phosphate compounds, e.g., triphenyl phosphate are used to retard or eliminate flammability. Haaf, U.S. Pat. No. 3,639,506, also incorporated herein by reference, discloses that triphenyl phosphate has a tendency to reduce physical properties and describes the use of combinations of aromatic phosphates and aromatic halogen compounds to flame retard the composition, without markedly lowering resistance to distortion by heat.

Pentaerythritol esters of phosphoric acid have been reported in Wahl et al, U.S. Pat. No. 3,090,799, to be generally superior as plasticizers and as flame retardants for synthetic resins. However, it is disclosed that from 5 to 40 parts of the said phosphate per 100 parts of the resin is the proper amount to use, and all of the working examples appear to fall in the range of 5 to 43 parts of the said cyclic phosphate per 100 parts of the combination, by weight.

It has now been discovered that cyclic phosphate compounds by themselves are effective non-plasticizing flame retardant additives for the compositions of polyphenylene ethers and styrene resins, at an unexpectedly lower concentration. Moreover, such cyclic phosphate materials are just as effective in flame retardance in this system as triphenyl phosphate and provide compositions with substantially the same impact resistance as the polymer composition itself.

DESCRIPTION OF THE INVENTION

According to this invention there are provided flame retardant compositions comprising (a) a normally flammable composition comprising a polyphenylene ether resin and a styrene resin, and (b) an effective, flame-retardant amount of a compound of the formula

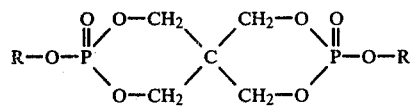

wherein R is alkyl of from 1 to 18 carbon atoms, aryl or alkaryl.

Preferred compositions are those in which the polyphenylene ether resin is of the formula

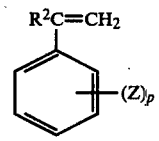

wherein the oxygen ether atom of one unit is connected to the benzene nucleus of the next adjoining unit, n is a positive integer equal to at least 50; and $R^1$, independently, is a monovalent substituent selected from hydrogen, halogen, hydrocarbon radicals free of a tertiary alpha carbon atom, halohydrocarbon radicals having at least two carbon atoms between the halogen atom and the phenyl nucleus and being free of a tertiary alpha carbon atom, hydrocarbonoxy radicals being free of a tertiary alpha carbon atom, or halohydrocarbonoxy radicals having at least two carbon atoms between the halogen atom and the phenyl nucleus and being free of a tertiary alpha carbon atom. Especially preferred resins are those in which $R^1$ is alkyl of from 1 to 6 carbon atoms, especially methyl.

Special mention is made of compositions wherein each $R^1$ is alkyl of from 1 to 6 carbon atoms. The component (a) can be made by those skilled in the art following the teachings of the above-mentioned Cizek patent, and the other references mentioned therein. These materials are also commercially available, e.g., from the General Electric Co., Pittsfield, Mass.

Preferred compositions also include those in which the styrene resin has at least 25 percent by weight units derived from a compound of the formula:

$$R^2C=CH_2$$

[benzene ring with $(Z)_p$ substituent]

wherein $R^2$ is hydrogen, alkyl of from 1 to 6 carbon atoms or halogen; Z is vinyl, halogen, or lower alkyl, and p is 0 or a whole number equal to the number of replaceable hydrogen atoms in the benzene nucleus. Preferred such styrene resins will be those in which p is 0 and $R^2$ is hydrogen. Typical styrene resins include, by way of example, homopolymers such as polystyrene and polychlorostyrene, the modified polystyrenes such as rubber modified polystyrenes (high impact polystyrenes), and the styrene containing copolymers, such as the styrene-acrylonitrile copolymers (SAN), styrene-butadiene copolymers, styrene/ethylene-propylene-butadiene terpolymers (EPDM), styrene maleic anhydride copolymers (SMA), styrene-acrylonitrile-alpha-alkyl styrene copolymers, styrene-acrylonitrile-butadene terpolymers (ABS), poly-alpha-methyl styrene, copolymers of ethyl-vinyl benzene and divinyl benzene, and the like.

The flame retardant cyclic phosphates will include compounds wherein R is straight or branched-chain alkyl of from about 1 to about 18 carbon atoms, e.g., methyl, ethyl, propyl, i-propyl, n-decyl, hexadecyl, octadecyl, and the like; aryl, e.g., phenyl, naphthyl, and the like, or alkaryl, e.g., benzyl phenethyl, and the like, containing up to about 18 carbon atoms. Preferably, in the cyclic phosphate, R will be methyl, decyl and, especially preferably phenyl.

The cyclic phosphates can be made by those skilled in the art, e.g., by following the procedure hereinafter, or in the above-mentioned Wahl et al patent, U.S. Pat. No. 3,090,799, the disclosure of which is incorporated herein by reference.

The manner of adding the flame retardant component (b) to the composition (a) is not critical. Preferably, however, such component is added as part of a blend premix, the latter being passed through an extruder with extrusion temperature being maintained between about 450° and 640° F. depending on the composition. The strands emerging from the extruder may be cooled, chopped into pellets, chopped into pellets and molded to a desired shape.

The concentration of the flame retardant additive (b) can vary, but is dependent to a large extent on the concentration of the styrene resin and the particular styrene resin used. Lower concentrations of styrene resin or less flammable styrene resins require a lower concentration of flame retardant. Moreover, cyclic phosphates which higher contents of phosphorous can be used in lower amounts. In general, however, amounts of from about 1 to about 10 parts by weight of component (b) can be used. However, to secure the major advantages, only from about 2 to about 4.5 parts per 100 parts by weight of (a) and (b) combined will be used in compositions for molding—as contrasted to film-casting.

Conventional additives, e.g., reinforcements, pigments, stabilizers, lubricants, and the like can also be included in conventional amounts.

DESCRIPTION OF THE PREFERRED EMBODIMENTS

The following examples illustrate the present invention. In each report, flame retardant properties are determined following procedures established by the Underwriters' Laboratory Bulletin, No. 94. To meet a V-1 rating, bars measuring $2\frac{1}{2}'' \times \frac{1}{2}'' \times \frac{1}{8}''$ thick are twice ignited for 10 seconds each time. The compositions shall:

A. Not have any specimens which burn with flaming combustion for more than 30 seconds after each application of the test flame.
B. Not have a total flaming combustion time exceeding 250 seconds for the 10 flame applications for each set of 5 specimens.
C. Not have any specimens which burn with flaming or glowing combustion up to the holding clamp.
D. Not have any specimens which drip flaming particles that ignite the dry absorbent surgical cotton located 12 inches (305 mm) below the test specimen.
E. Not have any specimens with glowing combustion which persists beyond 60 seconds after the second removal of the test flame.

EXAMPLES 1-3

Compositions comprising polyphenylene ether resin, polystyrene resin and a cyclic phosphate of the formula

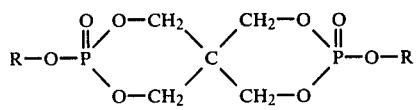

are preblended, extruded at 530° F. and chopped into molding granules. The granules are injection molded at 500° F. (cylinder) and 180° F. (mold) in a 3 oz. Newbury injection molding maching. Physical properties and burn test results for these and for comparison examples are set forth in the Table:

Table

| Compositions Comprising Polyphenylene Ether, Styrene Resin And Cyclic Phosphate | | | |
|---|---|---|---|
| Example | 1 | 1A* | 1B* |
| Compostion (pts. per hundred wt.) | | | |
| Poly(2,6-dimethyl-1,4-phenylene) ether[a] | 35 | 35 | 35 |
| Polystyrene resin[b] | 65 | 65 | 65 |
| Cyclic phosphate R = $C_6H_5$[c] | 4.5 | — | — |
| Triphenyl phosphate[d] | — | 7 | — |
| Properties | | | |
| Heat distortion temp. at 266 psi, °F. | 233 | 197 | 230 |
| Izod impact, ft.-lbs./in. notch | 4.0 | 4.7 | 3.6 |
| Gardner impact, in.-lbs. | 130 | 170 | 110 |
| Melt viscosity at 1500 sec.$^{-1}$ | 1520 | 1270 | 1550 |
| Uh 94 Rating | V-1 | V-1 | Burns |

*Control
[a] PPO, General Electric Co.
[b] FG 834 rubber modified polystyrene, Foster Grant Co.
[c] See procedure below.
[d] Conventional, plasticizing flame retarding agent

PROCEDURE

Pentaerythritol, 136 g., is introduced into 500 cc. of phosphorus oxychloride and heated on a steam bath. The pentaerythritol is completely dissolved over 30–45 minutes, with evolution of hydrogen chloride, the pentaerythritol ester of phosphorochloridic acid crystallizing out. The bulk of the phosphorus oxychloride is evaporated in a vacuum and the crystals are washed with methylene chloride. The ester, 300 g., and 220 g. of phenol are heated under reflux in 2 liters of methylene chloride after adding 100 cc. of triethylamine. The methylene chloride is distilled off, the residue is extracted with a mixture of water and methylene chloride. The amine salt is transferred to the aqueous phase and the phosphoric acid ester product transfers to the methylene chloride phase. The methylene chloride solution is separated, the solvent is evaporated off, and the residue comprises the product of the formula.

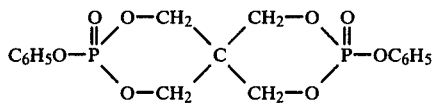

If the procedure is repeated, substituting for phenol, respectively, p-cresol, absolute ethanol, and octadecyl alcohol, correspondingly substituted pentaerythritol esters will be obtained.

These can be employed in combination with polyphenylene ether and styrene resins as set forth in the Example and efficiently flame retarded compositions according to this invention will be obtained.

Many variations will suggest themselves to those skilled in this art in the light of the above-detailed description. All such obvious variations are within the full intended scope of the invention as defined by the appended claims.

I claim:
1. A flame retardant composition comprising

(a) a normally flammable composition comprising a polyphenylene ether resin and a styrene resin, and
(b) an effective, flame-retardant amount of a compound of the formula

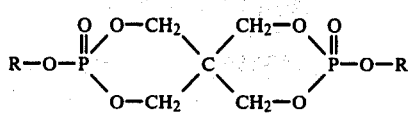

wherein R is alkyl of from 1 to 18 carbon atoms, aryl or alkaryl.

2. A composition as defined in claim 1 wherein said polyphenylene ether resin is of the formula

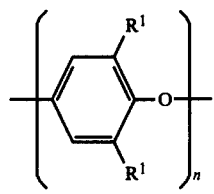

wherein the oxygen ether atom of one unit is connected to the benzene nucleus of the next adjoining unit, n is a positive integer equal to at least 50; and $R^1$, independently, is a monovalent substituent selected from hydrogen, halogen, hydrocarbon radicals free of a tertiary alpha carbon atom, halohydrocarbon radicals having at least two carbon atoms between the halogen atom and the phenyl nucleus and being free of a tertiary alpha carbon atom, hydrocarbonoxy radicals being free of a tertiary alpha carbon atom, or halohydrocarbonoxy radicals having at least two carbon atoms between the halogen atom and the phenyl nucleus and being free of a tertiary alpha carbon atom.

3. A composition as defined in claim 2 wherein each $R^1$ is alkyl of from 1 to 6 carbon atoms.

4. A composition as defined in claim 3 wherein each $R^1$ is methyl.

5. A composition as defined in claim 1 wherein the styrene resin comprises from 20 to 80 parts by weight per 100 parts by weight of component (a).

6. A composition as defined in claim 1 wherein said styrene resin has at least 25 percent by weight units derived from a compound of the formula:

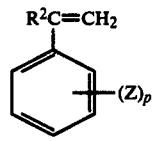

wherein $R^2$ is hydrogen, alkyl of from 1 to 6 carbon atoms or halogen; Z is vinyl, halogen, or lower alkyl, and p is 0 or a whole number equal to the number of replaceable hydrogen atoms in the benzene nucleus.

7. A composition as defined in claim 6 wherein p is 0 and $R^2$ is hydrogen.

8. A composition as defined in claim 1 wherein, in component (b), R is phenyl.

9. A composition as defined in claim 1 wherein the amount of component (b) is from 1 to 10 parts by weight per 100 parts by weight of (a) and (b) combined.

10. A process for decreasing the self-extinguishing time of a normally flammable composition comprising a polyphenylene ether resin and a styrene resin, said process comprising adding to said composition an effective flame-retardant amount of a flame-retardant of the formula

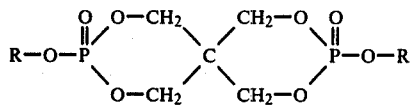

wherein R is alkyl of from 1 to 18 carbon atoms, aryl or alkaryl.

11. A process as defined in claim 10 wherein said polyphenylene ether resin is of the formula

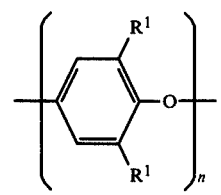

wherein the oxygen ether atom of one unit is connected to the benzene nucleus of the next adjoining unit, n is a positive integer equal to at least 50; and $R^1$, independently, is a monovalent substituent selected from hydrogen, halogen, hydrocarbon radicals free of a tertiary alpha carbon atom, halohydrocarbon radicals having at least two carbon atoms between the halogen atom and the phenyl nucleus and being free of a tertiary alpha carbon atom, hydrocarbonoxy radicals being free of a tertiary alpha carbon atom, or halohydrocarbonoxy radicals having at least two carbon atoms between the halogen atom and the phenyl nucleus and being free of a tertiary alpha carbon atom.

12. A process as defined in claim 11 wherein each $R^1$ is alkyl of from 1 to 6 carbon atoms.

13. A process as defined in claim 12 wherein each $R^1$ is methyl.

14. A process as defined in claim 10 wherein the styrene resin comprises from 20 to 80 parts by weight per 100 parts by weight of polyphenylene ether resin and styrene resin.

15. A process as defined in claim 10 wherein said styrene resin has at least 25 percent by weight units derived from a compound of the formula

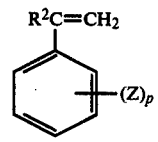

wherein $R^2$ is hydrogen, alkyl of from 1 to 6 carbon atoms or halogen; Z is vinyl, halogen, or lower alkyl, and p is 0 or a whole number equal to the number of replaceable hydrogen atoms in the benzene nucleus.

16. A process as defined in claim 15 wherein p is 0 and $R^2$ is hydrogen.

17. A process as defined in claim 10 wherein, in the flame-retardant, R is phenyl.

18. A process as defined in claim 10 wherein the amount of flame-retardant is from 1 to 10 parts by weight per 100 parts by weight of polyphenylene ether resin, styrene resin, and flame-retardant combined.

19. A process for decreasing the self-extinguishing time of a normally flammable composition comprising a polyphenylene ether resin and a styrene resin, said process comprising adding to said composition from 2 to 4.5 parts by weight per 100 parts by weight of polyphenylene ether resin, styrene resin, and flame-retardant combined, of a flame-retardant of the formula

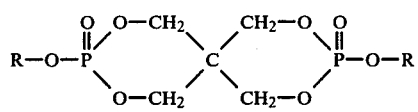

wherein R is alkyl of from 1 to 18 carbon atoms, aryl or alkaryl.

20. A flame retardant composition comprising
(a) a normally flammable composition comprising a polyphenylene ether resin and a styrene resin, and
(b) from 2 to 4.5 parts by weight per 100 parts of (a) and (b) combined of a compound of the formula

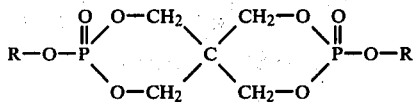

wherein R is alkyl of from 1 to 18 carbon atoms, aryl or alkaryl.

* * * * *